United States Patent
Hettinger

(10) Patent No.: US 7,180,214 B1
(45) Date of Patent: Feb. 20, 2007

(54) CONDENSER FAN MOTOR DUST SHIELD

(75) Inventor: Stephen Edward Hettinger, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/480,584

(22) Filed: Jan. 10, 2000

(51) Int. Cl.
*H02K 5/136* (2006.01)
*H02K 5/10* (2006.01)

(52) U.S. Cl. .......................... 310/88; 310/89; 403/297; 417/423.9

(58) Field of Classification Search .................. 310/88, 310/85, 89, 90; 277/370; 403/13, 297, 292; 417/423.12, 423.14, 423.9; 384/468
See application file for complete search history.

(56) References Cited

U.S. PATENT DOCUMENTS

| | | | |
|---|---|---|---|
| 669,577 A | 3/1901 | Eck ............................ 310/88 |
| 1,992,818 A * | 2/1935 | Else ........................... 384/468 |
| 2,743,385 A | 4/1956 | Potter ......................... 310/157 |
| 3,121,179 A | 2/1964 | Macks ......................... 310/90 |
| 3,544,820 A | 12/1970 | Wightman .................... 310/42 |
| 3,699,368 A | 10/1972 | Palmer ........................ 310/88 |
| 3,731,126 A | 5/1973 | Hagenlocher et al. ........ 310/68 |
| 3,846,652 A | 11/1974 | Lykes .......................... 310/90 |
| 3,855,489 A * | 12/1974 | Hershberger ................. 310/85 |
| 3,885,176 A * | 5/1975 | Cunningham ................ 310/88 |
| 4,061,002 A | 12/1977 | Drews ......................... 68/212 |
| 4,287,662 A * | 9/1981 | Otto ............................ 29/596 |
| 4,574,212 A | 3/1986 | Haijkens ...................... 310/88 |
| 4,680,495 A | 7/1987 | Chiampas et al. .......... 310/220 |
| 4,800,309 A * | 1/1989 | Lakin .......................... 310/90 |
| 4,832,674 A * | 5/1989 | Takemoto et al. .......... 474/166 |
| 4,841,187 A | 6/1989 | Hauke et al. ................ 310/171 |
| 4,939,397 A | 7/1990 | Morrill ........................ 310/88 |
| 5,045,736 A | 9/1991 | Amano et al. ............... 310/88 |
| 5,099,781 A | 3/1992 | Frank .......................... 118/52 |
| 5,111,093 A | 5/1992 | Tanaka ........................ 310/88 |
| 5,311,090 A | 5/1994 | Ferlatte ....................... 310/88 |
| 5,313,125 A | 5/1994 | Bosman et al. ........... 310/49 R |
| 5,619,082 A | 4/1997 | Choi ........................... 310/88 |
| 5,711,159 A | 1/1998 | Whipple ...................... 62/82 |

* cited by examiner

*Primary Examiner*—Karl Tamai
(74) *Attorney, Agent, or Firm*—Armstrong Teasdale LLP

(57) ABSTRACT

A dust shield for a refrigeration condenser fan motor includes a shroud having an opening for a motor output shaft, and a hub extending from the shroud. The shroud forms an enclosure to prevent contaminants from interfering with operation of the motor. The hub includes spring members that are displaced by the output shaft as the output shaft is inserted through the dust shield and applying a force to the shaft to hold the shield in place.

16 Claims, 3 Drawing Sheets

CONDENSER FAN MOTOR DUST SHIELD

BACKGROUND OF THE INVENTION

This invention relates generally to electric motors, and, more particularly, to a condenser fan motor for use in refrigeration systems.

Refrigerators typically include a compressor coupled to a condenser so that compressed refrigerant flows to the condenser. See, for example, U.S. Pat. No. 5,711,159. A condenser fan circulates air over a surface of the condenser to cool the compressed refrigerant and is powered by a condenser fan motor.

Condenser fan motors typically are four pole electric motors. Cost savings could be realized if two pole motors could be used. An important attribute of a condenser fan motor, however, is its ability to run in the presence of contaminants. Two pole motors can be vulnerable to contaminants, such as lint or hair, that become wrapped around the motor shaft and tend to migrate toward a front motor bearing. As the contaminates contact the motor bearing, oil is drawn from the bearing, which eventually can lead to motor failure. Also, the contaminants may bind the motor and prevent the output shaft from turning altogether.

Accordingly, it would be desirable to use more cost effective two pole motors for condenser fan applications while avoiding reliability concerns from contaminants reaching the front motor bearing.

BRIEF SUMMARY OF THE INVENTION

In an exemplary embodiment of the invention, a dust shield for a condenser fan motor comprises a shroud, a central opening through the shroud for receiving an output shaft of a condenser fan motor, and a hub extending from the shroud and adapted to obstruct at least a portion of the opening. Thus, as the dust shield is inserted onto the output shaft, the hub flexes, or is displaced around the output shaft, thereby forming a press fit connection to hold the shield to the shaft. When the shroud is positioned adjacent the housing, an enclosure is formed adjacent the housing that contains a portion of the output shaft and prevents contaminants from contacting the motor housing adjacent the output shaft where oil may be drawn from the motor bearings, and further prevents contaminants from binding the output shaft of the motor. Therefore, a lower cost two pole motor may be reliably used in a condenser fan application with the dust shield.

DETAILED DESCRIPTION OF THE INVENTION

Figure 1:
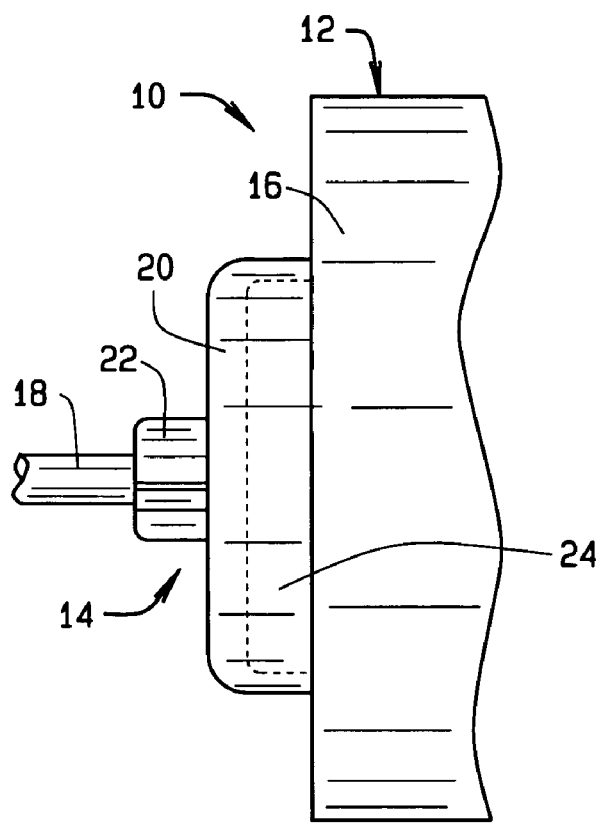
FIG. 1 is a partial side plan view of a condenser fan motor including a dust shield.

FIG. 1 is a partial side view of a condenser fan motor assembly 10 including a condenser fan motor 12 and a dust shield 14. Condenser fan motor 12 includes a motor housing 16 and an output shaft 18 for rotating a condenser fan blade (not shown). Motor 12 is an electric motor of a two pole construction to reduce the cost of motor 12, but it is contemplated that other types of motors could be used with dust shield 14 within the scope of the present invention.

Dust shield 14 includes a shroud 20 and a hub 22 extending from shroud 20. Shroud 20 forms an enclosure 24 (shown in phantom in FIG. 1) for containing an area of motor housing 16 adjacent output shaft 18 where a motor bearing or bearings (not shown) are typically located. When properly installed, shroud 20 prevents contaminants, such as dust, lint, and hair from entangling output shaft 18 and drawing oil from the motor bearing or bearings. Hub 22 extends from shroud 20 and attaches to motor output shaft 18 as explained below. Motor output shaft 18 extends from motor housing 16 through dust shield 14 and ultimately is connected to the condenser fan blade. In a particular embodiment, dust shield 14 is integrally molded from a durable plastic material, such as VALOX 357 made by General Electric Company.

Figure 2:
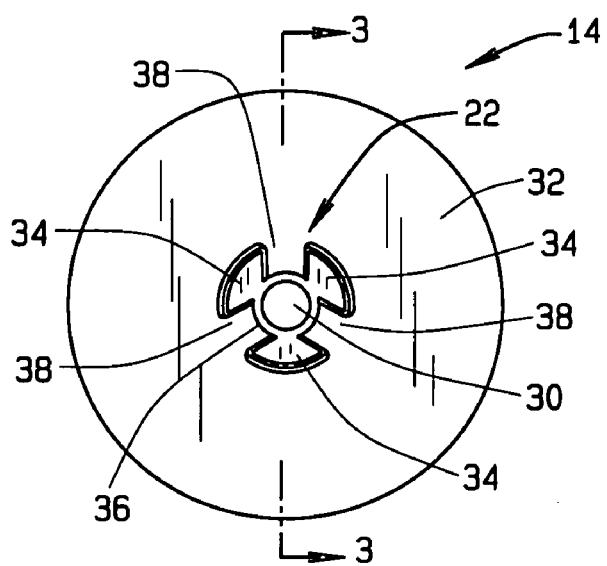
FIG. 2 is a top plan view of the dust shield shown in FIG. 1.

FIG. 2 is a top plan view of dust shield 14 including a central opening 30 through shroud 20, and hub 22 extending from shroud 20 around opening 30. Opening 30 is shaped and dimensioned to receive complementary shaped and dimensioned motor output shaft 18. Shroud 20 includes a substantially circular flat cover 32 extending from opening 30 a sufficient distance to encompass the front bearings of motor 12. Hub 22 includes a plurality of spring members 34 connected to an opening extension 36 and separated by a plurality of expansion slots 38. While the illustrated hub 22 includes three spring members 34 and three expansion slots 38, one or more spring members could be used in alternative embodiments, with or without one or more expansion slots.

Figure 3:
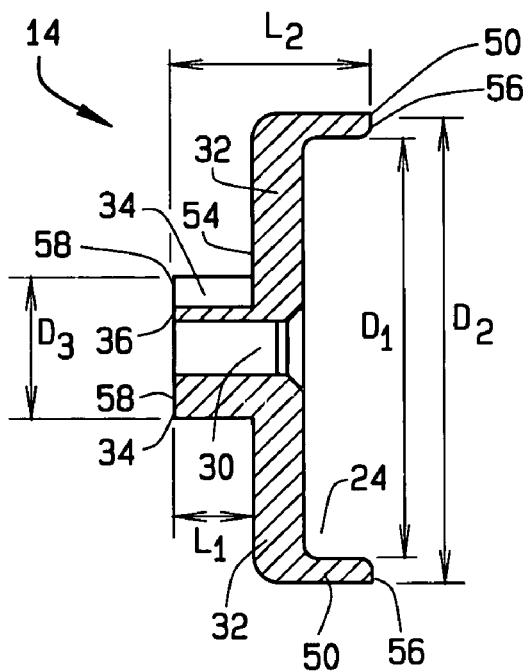
FIG. 3 is a cross sectional view of the dust shield shown in FIG. 2 along line 3—3.

FIG. 3 is a cross sectional view of dust shield 14 including a shroud cylindrical extension 50 extending from shroud cover 32 to form enclosure 24 having an inner diameter $D_1$ an outer diameter $D_2$. Opening 30 extends through shroud cover 32 and includes a tapered bore 52 to facilitate insertion of motor output shaft 18 (shown in FIG. 1) therethrough. Hub spring members 34 and opening extension 36 extend a distance $L_1$ from a top surface 54 of shroud cover 32 and hub 22 includes an external diameter $D_3$. A shroud extension bottom surface 56 is positioned a distance $L_2$ from a top surface 58 of hub spring members 34.

Figure 4:
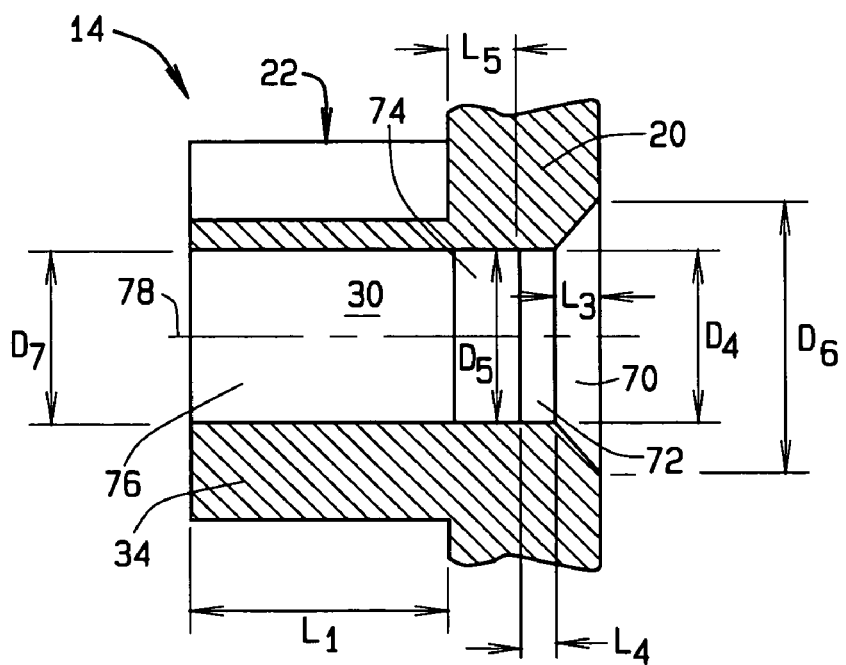
FIG. 4 is a magnified view of a portion of FIG. 3.

FIG. 4 is an enlarged cross sectional view of opening 30 through shroud 20 and hub 22 including a tapered portion 70, a first portion 72 having a constant radius D4 adjacent tapered portion 70, a second portion 74 having a constant radius D5 adjacent first portion 72, and a third transition portion 76 adjacent second portion 74. Tapered portion 70 decreases in diameter from a first diameter D6 to the smaller diameter D4 and extends a length L3 along an opening longitudinal axis 78. First portion 72 extends a length L4 along opening longitudinal axis 78. Second portion 74 extends a length L5 along an opening longitudinal axis 78. Transition portion 76 decreases in diameter from D5 to a diameter D7 at hub spring member top surface 58 over a distance L1. Thus, hub spring members 34 are tapered toward a center of opening 30 and restrict a size of opening 30 through dust shield 14.

In a particular embodiment, approximate dimensions of dust shield 14 are:

$D_1$=0.9 inches
$D_2$=1.0 inches
$D_3$=0.3 inches
$D_4$=0.126 inches
$D_5$=0.125 inches
$D_6$=0.132 inches
$D_7$=0.121 inches
$L_1$=0.175 inches
$L_2$=0.425 inches
$L_3$=0.03 inches $L_4$=0.025 inches
$L_5$=0.045 inches The dimensions are selected to engage hub spring members 34 to a selected motor output shaft 18 (shown in FIG. 1) and form an enclosure 24 (shown in FIG. 2) to protect an area of motor housing 16 adjacent motor output shaft 18, including the motor bearings, from contaminants such as dust, lint and hair.

In operation, opening 30 is fitted over motor output shaft 18, and output shaft 18 is inserted through opening 30. Because hub spring members 34 restrict opening 30, hub spring members 34 are outwardly displaced by output shaft 18 as it is inserted. Therefore, hub spring members 34 are placed in tension and expansion slots 38 (shown in FIG. 2) are enlarged as hub spring members 34 are displaced. A static compression force on output shaft 18 is produced by hub spring members 34, and a press fit connection is formed that engages hub 22 to output shaft 18 and holds dust shield 14 in place. By positioning shroud 20 adjacent motor housing 16, contamination of output shaft 18 near the motor bearings is avoided, and a low cost two pole motor can be used to operate a condenser fan.

Figure 5:
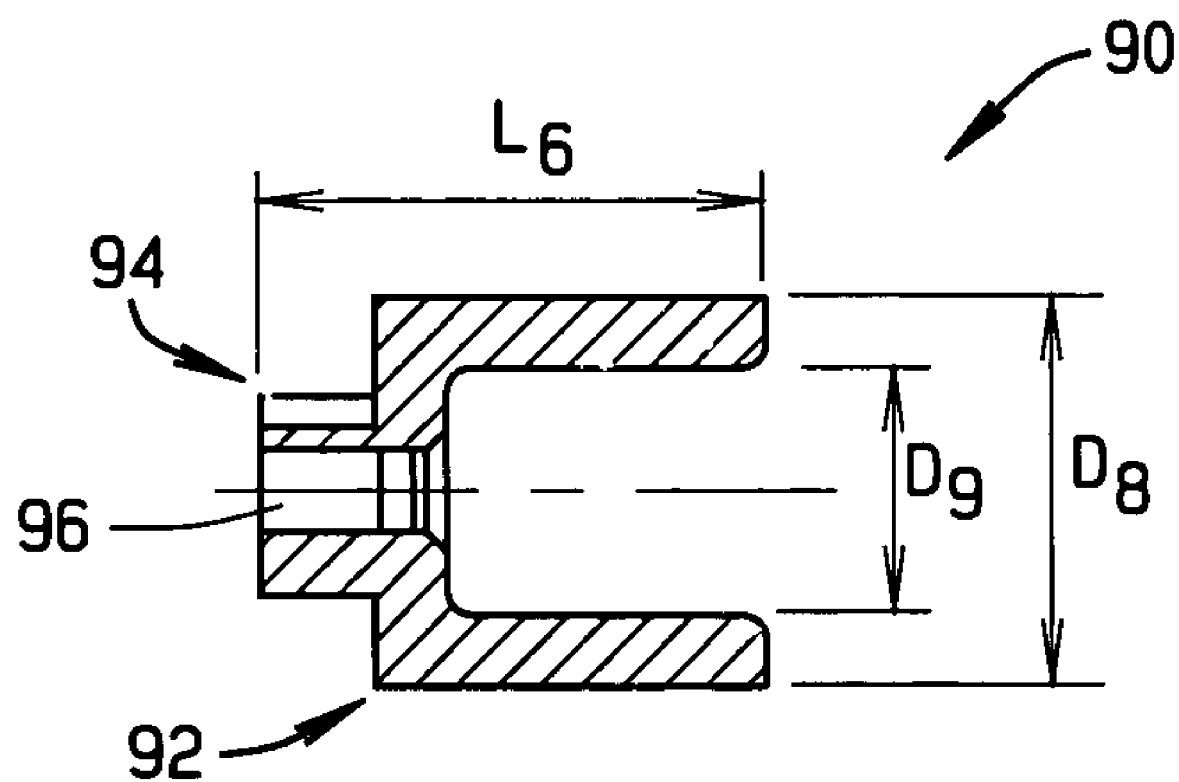
FIG. 5 is a cross sectional view of another embodiment of a dust shield.

FIG. 5 is a cross sectional view of a second embodiment of a dust shield 90 including a shroud 92, a hub 94, and an opening 96 similar to the embodiment described above but having the following approximate dimensions:

$D_8$=0.55 inches
$D_9$=0.35 inches
$L_6$=0.75 inches

Opening 96 and hub 94 share the approximate dimensions and construction as opening 30 and hub 22 described above in relation to FIGS. 2–4.

While the invention has been described in terms of various specific embodiments, those skilled in the art will recognize that the invention can be practiced with modification within the spirit and scope of the claims.

What is claimed is:

1. A method of shielding a condenser fan motor from contaminants, the condenser fan motor including a housing and an output shaft, said method utilizing a dust shield including a shroud, a center opening through the shroud, and a hub extending around a perimeter of the opening, wherein the hub includes an opening extension and a plurality of spring members extending from the opening extension, said method comprising:

fitting the opening of the shroud over the output shaft;
inserting the output shaft through the opening;
engaging the hub to the output shaft, wherein at least one of said spring members is outwardly displaced as the hub receives the output shaft thereby forming an interference fit between the hub and the output shaft; and
positioning the dust shield adjacent the housing such that the shroud defines an enclosure to encompass a part of the housing to prevent contaminants from reaching a portion of the output shaft adjacent the housing.

2. A method in accordance with claim 1 wherein the hub is tapered toward a center of the opening, said step of engaging the hub to the output shaft comprising the step of stretching the hub around the output shaft.

3. A method in accordance with claim 1 wherein the hub includes at least one slot separating a portion of the hub, said method of inserting the output shaft through the opening comprising the step of enlarging the at least one slot with the output shaft.

4. A condenser fan motor dust shield for shielding a condenser fan motor from contaminants wherein the condenser fan motor has an output shaft, said condenser fan motor dust shield comprising:

a shroud;
a central opening through said shroud and configured to receive the output shaft; and
a hub extending from said shroud and adapted to obstruct at least a portion of said central opening, said hub comprising an opening extension and a plurality of spring members coupled to said opening extension, each of said spring members separated by an expansion slot, wherein at least one of said spring members is outwardly displaced when the output shaft is received in said central opening.

5. A condenser fan motor dust shield in accordance with claim 4 wherein said hub is tapered toward a center of said opening.

6. A condenser fan motor dust shield in accordance with claim 4 wherein said hub further comprises at least one slot.

7. A condenser fan motor dust shield in accordance with claim 4 wherein said shroud and said hub are integrally molded.

8. A condenser fan motor dust shield in accordance with claim 4 wherein said shroud comprises a flat cover and a cylindrical extension extending from an outer perimeter of said cover.

9. A condenser fan motor dust shield in accordance with claim 8 wherein said opening and said cylindrical extension coincide along a longitudinal axis.

10. A shielded condenser fan motor assembly comprising:

a motor comprising a housing and an output shaft; and
a dust shield attached to said shaft, said dust shield comprising a shroud, and a hub extending from said shroud, said hub comprising an opening extension and a plurality of spring members extending from said opening extension, at least one of said spring members outwardly displaced around said output shaft, wherein said shroud forms an enclosure which encloses an area of said housing and said shaft.

11. A shielded condenser fan motor assembly in accordance with claim 10 wherein said hub comprises at least one slot.

12. A shielded condenser fan motor assembly in accordance with claim 10 wherein said shroud comprises a center opening, and said hub is tapered so as to obstruct said opening for press fit connection to said shaft.

13. A shielded condenser fan motor assembly in accordance with claim 10 wherein said shroud comprises a cover portion and a cylindrical portion extending from said cover portion.

14. A shielded condenser fan motor assembly in accordance with claim 10 wherein said spring members are separated by a plurality of expansion slots.

15. A shielded condenser fan motor assembly in accordance with claim 10 wherein said hub comprises a transition portion having a frustoconical cross section such that said hub is friction fit onto said output shaft as said dust shield is mounted to said output shaft.

16. A shielded condenser fan motor assembly in accordance with claim 10 wherein said a plurality of spring members are configured to exert a force on the output shaft, thereby engaging said hub to the output shaft and holding the dust shield in place.

* * * * *

UNITED STATES PATENT AND TRADEMARK OFFICE
CERTIFICATE OF CORRECTION

PATENT NO. : 7,180,214 B1
APPLICATION NO. : 09/480584
DATED : February 20, 2007
INVENTOR(S) : Hettinger It is certified that error appears in the above-identified patent and that said Letters Patent is hereby corrected as shown below:

In Claim 16, column 4, line 59, delete "said a plurality" and insert therefor -- said plurality --.

Signed and Sealed this

Sixteenth Day of October, 2007

JON W. DUDAS
*Director of the United States Patent and Trademark Office*